Dec. 9, 1930.  W. B. MURDOCH  1,784,380
BIT OR DRILL HOLDER
Filed July 19, 1928

Inventor
Walter B. Murdoch
By R. Clay Lindsey.
His Attorney

Patented Dec. 9, 1930

1,784,380

UNITED STATES PATENT OFFICE

WALTER B. MURDOCH, OF NEW BRITAIN, CONNECTICUT, ASSIGNOR TO THE STANLEY WORKS, OF NEW BRITAIN, CONNECTICUT, A CORPORATION OF CONNECTICUT

BIT OR DRILL HOLDER

Application filed July 19, 1928. Serial No. 293,897.

This invention relates to holders or chucks particularly adapted for use on braces or bit stocks. The invention particularly relates to a bit holder of the type having a body portion provided with a solid square socket for the polygonal end of the tool to be held; a pair of individual or separate jaws carried by the chuck body for longitudinal movement relative thereto, and a rotatable sleeve fixed against longitudinal movement with respect to the chuck body and having threaded relation with the jaws so that when the sleeve is turned, the jaws are moved and, when moved inwardly, the jaws are cammed towards one another so as to grip the shank of the tool to prevent it from being withdrawn from the socket.

It has been the practice, in bit holders of this sort, to provide on the sleeve a screw adapted to engage the end of the forward tooth or thread segment on one of the jaw members in order to limit the extent to which the sleeve could be rotated in a direction to feed the jaw members outwardly. Such an arrangement is open to various objections and disadvantages, among which may be mentioned that not infrequently the chuck gets out of order; the screw carried by the sleeve does not properly engage the end of the tooth which it was intended to engage, resulting in the screw slipping past the tooth and to a position where the sleeve can not be rotated in either direction to any appreciable extent; and the jaws may come out entirely.

The aim of the present invention is to provide an improved chuck having various features of novelty and advantage and, more particularly, to provide an improved arrangement wherein the above and other objections incident to chucks as heretofore made are eliminated.

In accordance with the present invention, a very simple, effective and economical arrangement is provided for limiting the extent of rotation of the sleeve and outward movement of the jaws, and for preventing the jaws from coming out entirely when the sleeve is in place.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the accompanying drawings, wherein is shown one embodiment which the present invention may take:

Figure 1:
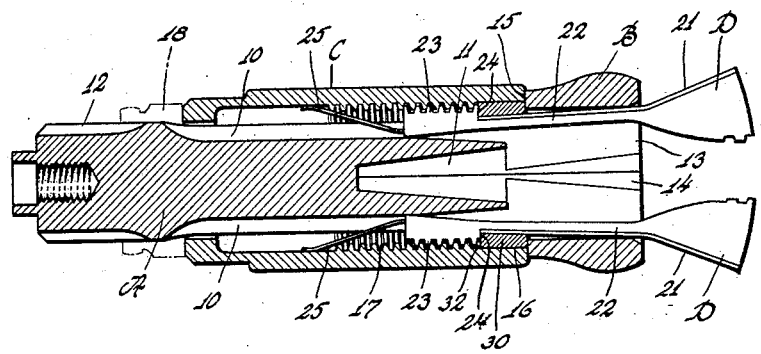
Figure 1 is a longitudinal sectional view through the chuck.
Figure 2:
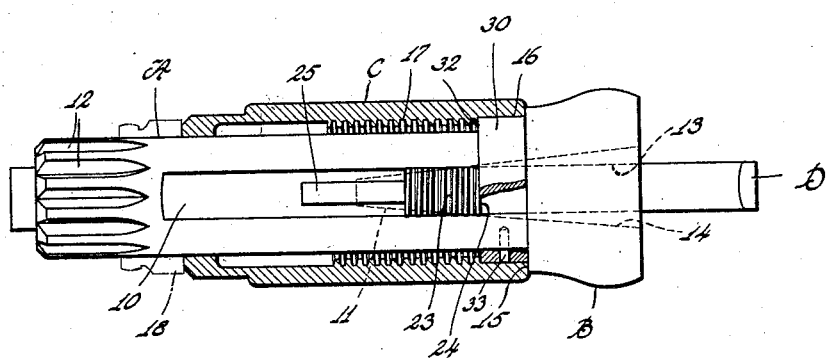
Fig. 2 is a similar view with the chuck turned 90°, the chuck body shown in elevation.

Referring to the drawings in detail, the chuck is shown as having a body formed of a core A and a head B. The chuck body may comprise a single casting of the usual construction. The core A is generally cylindrical in cross section and is provided at opposite sides with longitudinally extending grooves 10 of rectangular shape in cross section. In the forward end of the core is a square socket 11 which is adapted to receive and hold against turning the polygonal end of a tool, such as a bit or drill. On the rear end of the core may be provided the usual gear teeth 12 which may form part of the usual ratchet mechanism. The head has a generally rectangular shaped slot 13, the ends of which are in alignment with the grooves 10. The central portion of this slot 13 is notched at opposite sides, as at 14, so as to accommodate the corners of the square end of the tool as the latter is inserted in place. The rear end of the head provides a shoulder 15 against which engages a ring, hereinafter described more in detail.

The letter C designates the sleeve for controlling the jaws. This sleeve has, at its forward end, an unthreaded counterbored portion 16 rearwardly of which is an internal screw thread 17. The sleeve may be held against axial movement in the usual manner, the collar 18 being conventionally shown for this purpose.

The jaw elements are designated by the letter D. Each has a jaw portion 20, the outer edge of which is inclined, as at 21, so that, when the jaw elements are moved inwardly, the jaw portions are cammed towards each other by the engagement of the inclined surfaces 21 against the ends of the slot 13. Each of the jaw elements also has a stem portion 22 provided on its rear end with a screw segment forming a plurality of teeth 23 which are complementary to, and adapted to engage with, the internal thread 17 of the sleeve C.

The forward ends of the screw segments constitute shoulders 24. The outer ends of the jaw elements are normally urged away from each other by suitable springs 25 which may be of the usual construction.

In accordance with the present invention, there is provided, adjacent the forward ends of the grooves 10 and bridging the same, means having a shoulder, abutment or stop against which the forward ends of the threaded or segment portions of the jaw elements are adapted to engage so as to limit the extent to which the jaw elements may be moved outwardly by the sleeve and to prevent the jaw elements from being withdrawn from the chuck body while the sleeve is in place. In the present illustrative disclosure, this means is in the form of a ring 30 which is preferably made of resilient material and is split as at 31. This ring encircles the core A and engages against the shoulder 15. The counterbored portion 16 of the sleeve receives, and has a bearing on, the ring 30. Preferably, the ring is of such thickness that its internal diameter is less than the internal diameter of the thread 17 so that the rear end 32 of the ring constitutes an internal shoulder. By preference, each jaw element at the shoulder 24 is of greater thickness than the distance between the rear end 32 of the ring 30 and the bottom of the groove 10, so that, when the sleeve C is in place, the jaw elements, under no circumstances, can be entirely withdrawn from the chuck body. The ring 30 may be secured to the chuck body, as by means of a pin 33.

Figure 3:
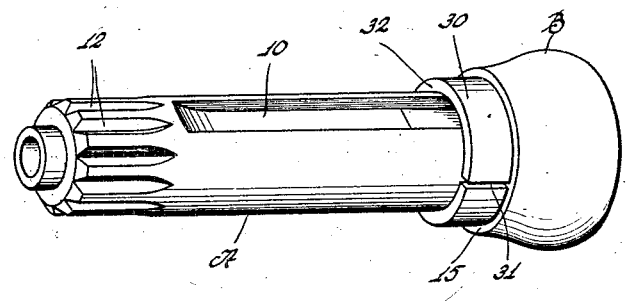
Fig. 3 is a perspective view of the chuck body with the split ring of the present invention thereon.

The parts may be assembled by placing the ring 30 on the chuck body, as shown in Fig. 3. Then the rear ends of the jaw elements are inserted through the slot 13 and into the grooves 10 and, during this operation, the ring will expand, if necessary, so as to permit the screw segments to move past the ring.

The sleeve C is now slipped over the rear end of the core and then rotated so as to engage the thread 17 of the sleeve with the teeth 23 of the jaw elements.

When it is desired to insert a tool into the chuck, the sleeve may be rotated so as to open the jaws. The extent to which the sleeve may be rotated in a direction to open the jaws is limited by the engagement of the shoulders 24 at the forward end of the thread segments against the rear end 32 of the ring 30. This engagement is positive and effectively prevents the removal of the jaw elements from the chuck body when the sleeve is in place. It is impossible to spring the outer ends of the jaw elements towards each other and then pull the jaws out of the chuck body.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention, which, as a matter of language, might be said to fall therebetween.

I claim as my invention the following:

1. In a chuck of the character described, a body portion having a core and a head, said core having a socket and longitudinally extending grooves in its opposite sides, jaw elements slidably mounted in said grooves, a sleeve about said core and having an internal thread, said jaw elements having threaded portions engaging said thread, and means on said body portion bridging said grooves adjacent their forward ends and against which the forward ends of said threaded portions are adapted to engage.

2. In a chuck of the character described, a body portion having a core and a head, said core having a socket at one end and longitudinally extending grooves in its opposite sides, said head having a slot with its ends in alinement with said grooves, a sleeve about said core and having an internal thread; separate jaw elements slidably mounted in said grooves and said slot and having at their rear ends threaded portions engaging said thread, said jaw elements having shoulders at the forward ends of said threaded portions; and means on said body portion bridging said grooves and forming a shoulder against which said shoulders of said jaw elements are adapted to engage.

3. In a chuck of the character described, a body portion having a core and a head, said core having a socket at one end and longitudinally extending grooves in its opposite sides, a rotatable sleeve about said core and having an internal thread, jaw elements slidably mounted in said grooves and each having a threaded portion cooperating with the thread of said sleeve and a shoulder adjacent the forward end of the threaded portion; and a ring about said core and forming a shoulder against which said shoulders of said jaw elements are adapted to engage to limit the outward movement of the jaw elements.

4. In a chuck of the character described, a body portion having a core and a head, said core having a socket in one end and longitudinally extending grooves in its opposite sides, and said head having a slot; a rotatable sleeve about said core and having an internal thread; jaw elements slidably mounted in said grooves and extending through said head, said jaw elements having threaded segments engaging said internal thread; and a split ring on said core and bridging said grooves and forming a stop against which the forward ends of said threaded segments are adapted to engage to limit the outward movement of the jaws.

5. In a chuck of the character described, a body portion having a core and a head, said core having a socket at one end and longitudinally extending grooves in its opposite sides, and said head having a slot; a rotatable sleeve about said core and having an internal thread and a counterbored portion; separate jaw elements slidably mounted in said grooves and extending through said slot in said head, said jaw elements having thread segments engaging said thread and provided with shoulders at their forward ends; a split ring on said core and within said counterbored portion, the rear end of said split ring constituting an abutment against which the said shoulders on said jaw elements are adapted to engage, the distance between said abutment and the bottoms of said grooves being less in extent than the thickness of said jaw elements at said shoulders.

WALTER B. MURDOCH.